US012593169B2

(12) United States Patent
Kenefick et al.

(10) Patent No.: US 12,593,169 B2
(45) Date of Patent: Mar. 31, 2026

(54) DIRECTION-BASED FILTERING FOR AUDIO DEVICES USING TWO MICROPHONES

(71) Applicant: SONY GROUP CORPORATION, Tokyo (JP)

(72) Inventors: Justin Kenefick, San Diego, CA (US); James R Milne, Ramona, CA (US); Allison Burgueno, Oceanside, CA (US); Gregory P Carlsson, Santee, CA (US)

(73) Assignee: SONY GROUP CORPORATION, Tokyo (JP)

( * ) Notice: Subject to any disclaimer, the term of this patent is extended or adjusted under 35 U.S.C. 154(b) by 173 days.

(21) Appl. No.: 18/509,860

(22) Filed: Nov. 15, 2023

(65) Prior Publication Data

US 2025/0159404 A1 May 15, 2025

(51) Int. Cl.

*H04R 1/40* (2006.01)
*H04R 3/00* (2006.01)
*H04R 25/00* (2006.01)
*H04S 7/00* (2006.01)

(52) U.S. Cl.

CPC ............. *H04R 1/406* (2013.01); *H04R 3/005* (2013.01); *H04R 2410/01* (2013.01)

(58) Field of Classification Search

None

See application file for complete search history.

(56) References Cited

U.S. PATENT DOCUMENTS

| | | | | |
|---|---|---|---|---|
| 8,442,246 B2 * | 5/2013 | Morii | H04R 25/407 381/313 |
| 11,706,575 B2 * | 7/2023 | Lawrence | H04R 25/552 381/23.1 |
| 2002/0041696 A1 * | 4/2002 | Jensen | H04R 29/006 381/317 |
| 2009/0262969 A1 | 10/2009 | Short | |

(Continued)

FOREIGN PATENT DOCUMENTS

| | | |
|---|---|---|
| DE | 10249416 A1 | 5/2004 |
| EP | 2088802 A1 | 8/2009 |
| JP | 2019-083515 A | 5/2019 |

*Primary Examiner* — Qin Zhu

(74) *Attorney, Agent, or Firm* — CHIP LAW GROUP

(57) ABSTRACT

An electronic apparatus and method for direction-based filtering for audio devices using two microphones is provided. The electronic apparatus receives a first sound signal that corresponds to a sound that reaches a left ear of a user and a second sound signal that corresponds to the sound that reaches the right ear of the user. The electronic apparatus computes differences between the received sound signals. The difference includes at least one of an amplitude difference or a phase difference. The electronic apparatus further determines the difference to be within a threshold difference range and filters both sound signals based on the determination. The electronic device determines a frequency response of the sound signals and filters the sound signals further based on the characteristics of the frequency response. Thereafter, the electronic apparatus controls a playback of the amplified or filtered first sound signal and the amplified second sound signal.

15 Claims, 5 Drawing Sheets

(56) References Cited

U.S. PATENT DOCUMENTS

| | | | | |
|---|---|---|---|---|
| 2010/0067707 | A1* | 3/2010 | Schwerdtner ........ | H04R 25/552<br>381/23.1 |
| 2011/0200215 | A1* | 8/2011 | Apfel ..................... | H04R 25/70<br>381/314 |
| 2015/0230026 | A1 | 8/2015 | Eichfeld | |
| 2015/0230036 | A1* | 8/2015 | Pedersen .............. | H04R 25/305<br>381/330 |
| 2018/0146284 | A1 | 5/2018 | Benattar | |
| 2023/0353988 | A1* | 11/2023 | Pedersen .............. | H04B 1/3827 |

* cited by examiner

DIRECTION-BASED FILTERING FOR AUDIO DEVICES USING TWO MICROPHONES

CROSS-REFERENCE TO RELATED APPLICATIONS/INCORPORATION BY REFERENCE

None.

FIELD

Various embodiments of the disclosure relate to smart wearable audio devices. More specifically, various embodiments of the disclosure relate to an electronic apparatus and method direction-based filtering for audio devices using two microphones.

BACKGROUND

Wearable technology advancements have resulted in the development of smart wearable audio devices (such as smart hearing aids or electronic listening devices) that aid in the auditory perception of a user, such as a user with a hearing impairment. These devices are sometimes used in a noisy environment. Regardless of hearing loss or typical hearing, when in a noisy setting a person can decide to or subconsciously focus on specific sounds while ignoring distracting sounds (i.e., noise). When a person struggles with sound localization, subconscious mental filtering of background noise becomes considerably less effective. Issues with sound localization may be from hearing loss in one or both ears, or from hearing aids that don't recreate soundstage and imaging well enough for the subconscious audio filtering to be effective. Due to this, it is more difficult for a person with hearing loss to understand specific sounds in a noisy environment without background noise filtering. Sound comprehension may be challenging in areas with a lot of background noise even for people who only have mild hearing loss.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for audio filtering of incoming sound based on the direction the user is facing is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
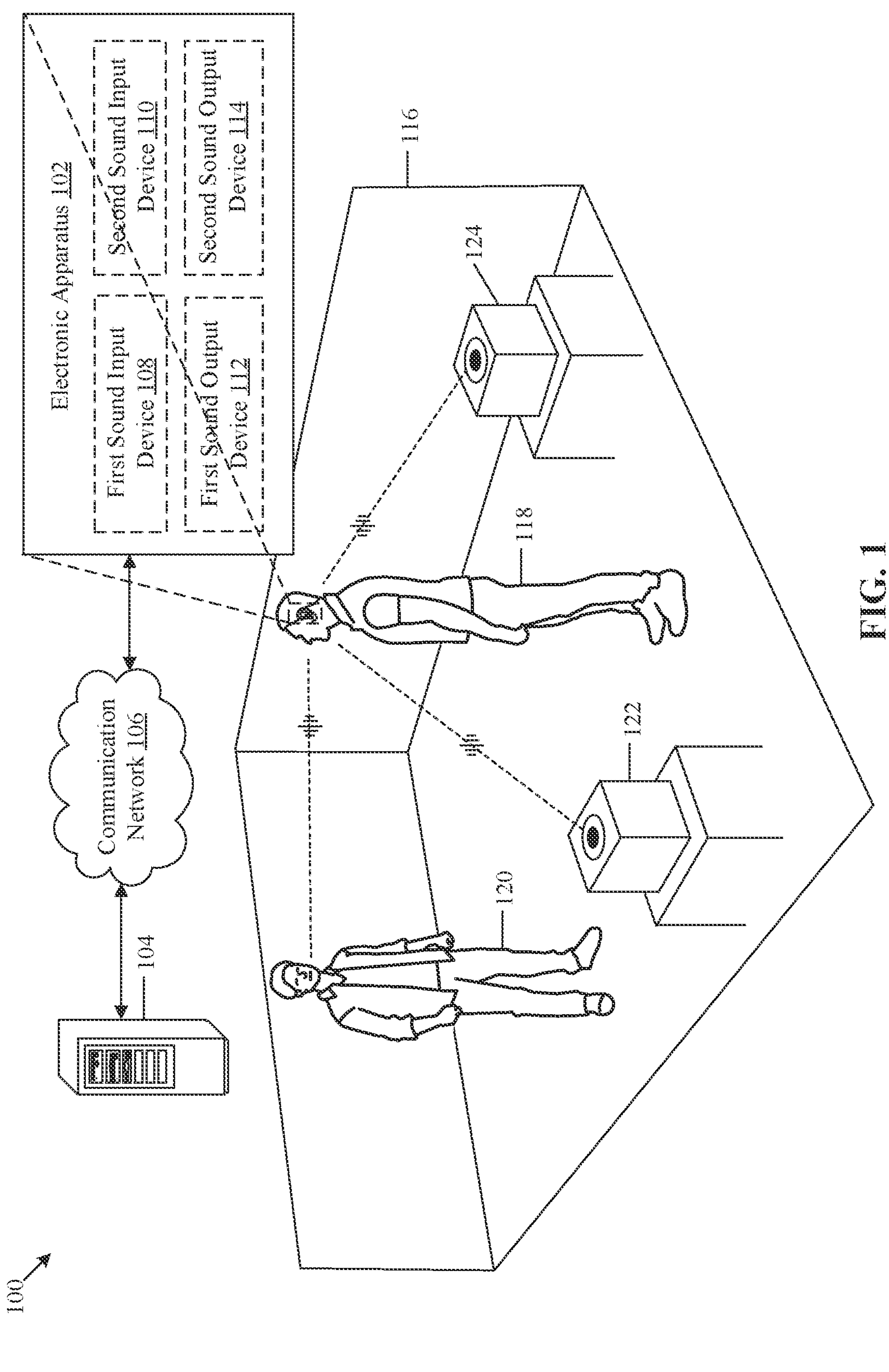
FIG. 1 is a diagram that illustrates an exemplary network environment for audio enhancement for incoming sound from specific directions, in accordance with an embodiment of the disclosure.

The following described implementations may be found in a disclosed electronic apparatus for audio enhancement for incoming sound from specific directions. Exemplary aspects of the disclosure provide an electronic apparatus (for example, a hearing-aid or a head-mounted wearable such as a virtual reality headset) that may include sound input devices and sound output devices. The electronic apparatus may generate sound signals based on sound waves (i.e., incoming sounds) captured by the sound input devices from various directions in a closed or open environment. The generated sound signals may be amplified for playback via the sound output devices or may be attenuated. The amplification or attenuation may be based on relative properties (for example, amplitude or phase) associated with the sound signals corresponding to the sound waves that may have been captured by the sound input devices. The relative properties of the sound signals, based on which the sound signals may be amplified or attenuated, may vary based on a change in a head orientation of a user who may wear the electronic apparatus on the head. Thus, the audio enhancement (i.e., amplification) of an incoming sound may depend on a direction towards which the head of the user may be pointing.

The electronic apparatus may receive, via a first sound input device (such as a microphone), a first sound signal that may correspond to a sound (i.e., a sound wave) that may reach a left ear of a user. The electronic apparatus may further receive, via a second sound input device (such as a microphone), a second sound signal that may correspond to the sound that may reach a right ear of the user. Thereafter, the electronic apparatus may compute a first difference between the first sound signal and the second sound signal. The first difference may include at least one of an amplitude difference or a phase difference. The electronic apparatus may further determine the first difference to be within a threshold difference range and may amplify each of the first sound signal and the second sound signal based on the determination that the first difference is within the threshold difference range. Thereafter, the electronic apparatus may control, via a plurality of sound output devices (such as in-ear earphone drivers), a playback of the amplified first sound signal and the amplified second sound signal.

In order to mitigate background noise issues, the proposed electronic apparatus may enhance certain sounds that may be of interest to a user and attenuate unwanted sounds based on a head orientation of the user. The head orientation typically impacts properties of sound signals that may be received by the electronic apparatus. Based on relative values of one or more properties (such as amplitude and phase) of the sound signals, the electronic apparatus may amplify or attenuate the sound signals. For example, if an amplitude difference or a phase difference between two sound signals (that correspond to sounds reaching the left ear and the right ear of the user) is less than a threshold amplitude or threshold phase, then the sound signals may be amplified. On the other hand, if the amplitude difference or the phase difference is greater than the threshold amplitude or threshold phase, the sound signals may be attenuated. The threshold amplitude and the threshold phase may be adjustable based on a user input which may be received via a switch in the electronic apparatus, a display associated with the electronic apparatus, or another control mechanism.

Typically, sound sources immediately in front of a person may result in close to equal volume measurements for left and right ears, as well as same phase information at each microphone. When the user is facing a person, the path difference between the sound reaching the left ear and the sound reaching the right ear is lowest as compared to a path difference when the person is not directly in line of sight of (i.e., facing) the user. Therefore, the phase difference may be less than the phase difference range (i.e., the first difference may be within the threshold difference range). As the sound source goes off-center from the user, the volume and phase of the measurements may vary more and more between the left and right microphones (i.e., the sound input devices). The symmetry or non-symmetry of left and right measurements may be analyzed to select the sound signals that need to be amplified. Specifically, if the relative amount of symmetry is treated as a gate with a varying threshold, the amount of angle relative to the off-center may be adjusted to change a range of sound sources that can be included in the amplified sound signal for the user. A smaller relative amplitude (i.e., amplitude difference) or a smaller relative phase (i.e., phase difference) may indicate that a sound source is situated in-front of the user, or the user may be facing the sound source. For example, the sound source may correspond to a person who may be in a conversation with the user.

Unlike conventional approaches, the disclosed electronic apparatus does not require sound localization or source tracking (in case of moving sound sources). In contrast, the electronic apparatus relies on simpler phase/amplitude measurements to determine how centered the source is with respect to the head direction (or head orientation). The more centered a source is, the more amplification is applied on the sound signals that correspond to such a source. This simplification allows for less processing and greater performance in other areas with less compromises on the overall design of the hearable device.

In a conversation (in a noisy environment), people usually face each other during communication. With a suitable threshold difference range, the user can look (i.e., move head) in the direction they want the sound to amplified (which in a noisy environment may be towards a person during a discussion or a different type of source). The amount of directionality may be adjusted to select a focus area in that direction. For example, the focus area (in terms of the threshold difference range) may be selected to be directly in front of head, a value of +/−10 degrees, a value of +/−30 degrees, a value of +/−60 degrees, and the like. The directionality (through a user input) may be controlled by a switch on the electronic apparatus. Additionally, or alternatively, the directionality may be controlled via voice control, application control, tap control, gesture control (e.g., head movement via nodding front to back or side to side), or a button. In such cases, the user input may be, for example, a voice input, a gesture input, a touch input, and the like. The voice input may be received via a microphone included in the electronic apparatus. The gesture input may be detected based on a monitoring of the head of the user, and the touch input may be received via a display associated with the electronic apparatus. By focusing on the sound in front of the head, speech comprehension in noisy environments may dramatically increase, with the focus based simply on the direction the user is looking.

FIG. 1 is a diagram that illustrates an exemplary network environment for audio enhancement for incoming sound from specific directions, in accordance with an embodiment of the disclosure. With reference to FIG. 1, there is shown a network environment 100. The network environment 100 may include an electronic apparatus 102 and a server 104. The electronic apparatus 102 may communicate with the server 104, through one or more networks (such as a communication network 106). In an exemplary embodiment, the electronic apparatus 102 may include a first sound input device 108, a second sound input device 110, a first sound output device 112, and a second sound output device 114. Each of the first sound input device 108, the second sound input device 110, the first sound output device 112, and the second sound output device 114 may be integrated with electronic apparatus 102 and may be an internal component of the electronic apparatus 102. In some embodiments, each of the first sound input device 108, the second sound input device 110, the first sound output device 112, and the second sound output device 114 may be external (i.e., peripheral) to the electronic apparatus 102. There is further shown a built environment 116 in which a user 118 is shown wearing the electronic apparatus 102. By way of example, and not limitation, the built environment 116 further includes a person 120 (who may be acting as a sound source), a first sound source 122, and a second sound source 124.

The electronic apparatus 102 may include suitable logic, circuitry, interfaces, and/or code that may be configured to control the first sound input device 108, the second sound input device 110, the first sound output device 112, and the second sound output device 114. The first sound input device 108 and the second sound input device 110 may be controlled to generate electrical signals corresponding to sound that arrives at the ears of the user 118. The first sound output device 112 and the second sound output device 114 may be controlled to output sound after some filtering of the electrical signals. The electronic apparatus 102 may generate an amplified version of the sound signals based on a head orientation of the user 118. In a preferred embodiment, the electronic apparatus 102 may be a headphone, a hearing aid, or a head-mounted wearable (such as a virtual/augmented/mixed reality headset). Examples of electronic apparatus 102 may include, but are not limited to, a hearable device which integrates the sound input and output devices, a desktop, a tablet, a laptop, a computing device, a smartphone, a cellular phone, a mobile phone, or a consumer electronic device. The electronic apparatus 102 may be configured to rely on wireless communication protocols, such as Bluetooth®, Wireless-Fidelity (Wi-Fi), or Bluetooth® Low Energy (BLE) to transmit control instructions to the first sound input device 108, the second sound input device 110, the first sound output device 112, and the second sound output device 114.

The server 104 may include suitable logic, circuitry, interfaces, and/or code that may be configured to store data associated with the electronic apparatus 102. At regular intervals or at a user-defined schedule, at least a portion of the data stored on the server 104 may be synched with data stored on the electronic apparatus 102. The data may include, for example, user preferences associated with a processing of the sound signals, usage data associated with the electronic apparatus, and the like. The user preferences may include, for example, a preference to process the sound signals based on the head-orientation, a location-based activation of the preference, a schedule-based activation of the preference, a level of the amplification associated with the preference, and the like. In accordance with an embodiment, the user preferences may be determined based on analysis of the usage data.

The server 104 may execute operations through web applications, cloud applications, HTTP requests, repository operations, file transfer, and the like. Example implementations of the server 104 may include, but are not limited to, a database server, a file server, a web server, an application server, a mainframe server, a cloud computing server, or a combination thereof.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic apparatus 102 as separate entities. In certain embodiments, the functionalities of the server 104 can be incorporated in its entirety or at least partially in the electronic apparatus 102, without a departure from the scope of the disclosure.

The communication network 106 may include a communication medium through which the electronic apparatus 102 and the server 104 may communicate with each other. The communication network 106 may be a wired or wireless communication network. Examples of the communication network 106 may include, but are not limited to, Internet, a Wireless Fidelity (Wi-Fi) network, a Personal Area Network (PAN), a Local Area Network (LAN), or a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, Enhanced Data rates for Global System for Mobile Communication (GSM) Evolution (EDGE), Institute of Electrical and Electronics Engineers (IEEE) 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Each of the first sound input device 108 and the second sound input device 110 may include suitable logic, circuitry, and/or interfaces that may be configured to acquire sound that may arrive from different sound sources in the built environment 116. The acquisition may be performed based on a reception of control instructions from the electronic apparatus 102. Each of the first sound input device 108 and the second sound input device 110 may be further configured to convert the captured sound into digital signals (i.e., sound signals). Example of the first sound input device 108 and the second sound input device 110 may include but is not limited to, electret microphones, dynamic microphones, carbon microphones, piezoelectric microphones, fiber microphones, or Micro-Electro-Mechanical-Systems (MEMS) microphones.

Each of the first sound output device 112 and the second sound output device 114 may include suitable logic, circuitry, and/or interfaces that may be configured to receive control instructions from the electronic apparatus 102 to output sound signals (which may be of interest to the user 118 and may be selectively amplified by the electronic apparatus 102). Examples of the first sound output device 112 and the second sound output device 114 may include, but are not limited to, loudspeakers or other transducers that convert an electrical signal to sound.

The built environment 116 may be a physical structure that may be offered to people to perform various kinds of social, cultural, or economic activities. Examples of the built environment 116 may include, but are not limited to, a residential space (such as an apartment or a house), a commercial space (such as an office space, a hotel room, or a hall), or a particular space in a residential or commercial space. The built environment 116 may be an open or outdoor space, such as a field or some other open urban setting.

In operation, the electronic apparatus 102 may be configured to receive, via the first sound input device 108, a first sound signal that corresponds to the sound that reaches the left ear of the user 118. The first sound input device 108 (for example, a microphone or a pair of microphones) may be located on the head of the user 118 and around the left ear of the user 118. Similarly, the electronic apparatus 102 may be further configured to receive, via the second sound input device 110, a second sound signal that may correspond to the sound that reaches a right ear of the user 118. The second sound input device 110 (for example, a microphone or a pair of microphones) may be located on the head of the user 118 and around the right ear of the user 118. If the sound that arrives at the first sound input device 108 or the second sound input device 110 is a mixture of sounds from multiple sources, then audio source separation may be used to recover the constitutive sounds from the mixture.

The electronic apparatus 102 may be further configured to compute a difference between the first sound signal and the second sound signal. The difference may include at least one of an amplitude difference, i.e., interaural level difference, or a phase difference, i.e., interaural time difference, between the first sound signal and the second sound signal. In accordance with an embodiment, the electronic apparatus 102 may determine values of parameters (amplitude or phase) associated with each of the first sound signal are the second sound signal. The determined values of the parameters of the first sound signal may differ more from the determined values of parameters of the second sound signal when the sound sources are more off-center from the head/face direction of the user 118.

In accordance with an embodiment, the electronic apparatus 102 may be configured to determine a first time of the reception of the first sound signal and a second time of the reception of the second sound signal. Based on a difference between the first time and the second time, i.e., the interaural time difference, the electronic apparatus 102 may determine a delay (of reception) between the second sound signal and the first sound signal, or a delay between the first sound signal and the second sound signal. Thereafter, the electronic apparatus 102 may compute the phase difference or the interaural time difference between the first sound signal and the second sound signal based on the difference between the first time and the second time (i.e., the delay) and a frequency of each of the first sound signal and the second sound signal. For example, if ("f") is frequency of the first sound signal and the second sound signal in Hertz, and ("$\delta$") is the delay in seconds, then the phase difference ("$\Delta\phi$") may be computed in radians as $\Delta\phi=2\pi f\delta$. The phase difference may correspond to one of the methods of analysis of the difference between the first sound signal and the second sound signal.

In accordance with an embodiment, the electronic apparatus 102 may be configured to measure a first amplitude of the first sound signal and a second amplitude of the second sound signal. Each of the first amplitude and the second amplitude may be measured at a certain time instant. Thereafter, the electronic apparatus 102 may compute the amplitude difference or the interaural level difference between the first sound signal and the second sound signal based on a difference between the first amplitude and the second amplitude at the time instant. The amplitude difference (i.e., the interaural level difference) may correspond to one of the methods of analysis of the difference between the first sound signal and the second sound signal.

After the differences are determined, the electronic apparatus 102 may be further configured to determine whether the difference between the first sound signal and the second sound signal is within a threshold difference range. The threshold difference range may correspond to a phase difference range or an amplitude difference range. Specifically, the first difference may be within the threshold difference range if the phase difference (i.e., delay) between the first sound signal and the second sound signal is within the phase difference range or if the amplitude difference (which may be computed at a particular time-instant) between the first sound signal and the second sound signal is within the amplitude difference range. The threshold difference range may be manually set by the user or may be set based on default settings such that sounds which are similar enough so as to meet the threshold difference range are passed or amplified. Such determination (that the first difference is within the threshold difference range) may indicate that user 118 is facing the sound source. Typically, sound sources immediately in front of a person (such as user 118) may result in closer to equal volume measurements for left and right ears, as well as the same phase information at each microphone. When the user 118 is facing the person 120, the path difference between the sound reaching the left ear and the sound reaching the right ear is lowest as compared to a path difference when the person 120 is not directly in line of sight of (i.e., facing) the user 118. Therefore, the phase difference may be less than the phase difference range (i.e., the first difference may be within the threshold difference range). As the sound source goes off-center from the user 118, the volume and phase of the measurements may vary more and more between the left and right microphones (i.e., the sound input devices 108 and 110). The symmetry or non-symmetry of left and right measurements may be analyzed to select the sound signals that need to be amplified or filtered. Specifically, if the relative amount of symmetry is treated as a gate with a varying threshold, the amount of angle relative to the off-center may be adjusted to change a range of sound sources that can be included in the amplified or filtered sound signal for the user 118.

In accordance with an embodiment, the electronic apparatus 102 may receive a user input. The user input may be a touch input that may be received via a switch on the electronic apparatus 102 or a display device associated with the electronic apparatus 102. The display device may be coupled to the electronic apparatus 102 or a standalone device (not shown) that may be connected to electronic apparatus 102 via the communication network 106. In some embodiments, the user input may be a voice input captured by the electronic apparatus 102. The input may be indicative of a value for the threshold difference range (i.e., the phase difference range or the amplitude difference range). A higher value of the threshold may indicate that the user 118 wants to focus on sound sources in a wider field of view of the user 118. On the contrary, a smaller value of the threshold may indicate that the user 118 wants to focus on sound sources that are in a narrower field of view of the user or directly facing the user 118.

In some embodiments, the user input may be provided via an application accessible via the display device. In some other embodiments, the user input may be a gesture input that constitutes a movement of the head of the user 118 along a specific direction. For example, the gesture input may be a "front-to-back" movement or a "side-to-side" movement. The direction of movement may be indicative of an instruction to update a current value of threshold difference range to a higher value or a lower value. The extent of the movement may correspond to a value with respect to which the current threshold difference range value must be adjusted. For example, the "front-to-back" (or a "left-to-right") movement may indicate an instruction to increase a current value of the threshold difference range. On the other hand, a "back-to-front" (or a "right-to-left") movement may indicate an instruction to decrease a current value of the threshold difference range. The electronic apparatus 102 may monitor the movement of the head. Based on a detection of a movement of the head, the threshold difference range may be updated.

In some instances, a person (i.e., a new sound source) may walk up to join an ongoing conversation with another person (i.e., another sound source). In such instances, it may be necessary to quickly raise the threshold difference range to accommodate the two (or more) people standing in front of the user 118. The electronic apparatus 102 may be configured to automatically update the threshold difference range based on a determination that the first difference is outside a first threshold difference range. The first difference may be, for example, a phase difference of 22 degrees and the first threshold difference range may be ±20 degrees. The first threshold difference range may be an initial value of the threshold difference range. Based on the determination, the electronic apparatus 102 may update the first threshold difference range such that the first difference is within the updated first threshold difference range. For example, the first threshold difference range may be updated to ±25 degrees. Thus, the first difference (22 degrees) may be updated to lie within the updated first threshold difference range (±25 degrees) and the updated first threshold difference range may be set as the final value of the threshold difference range.

The threshold difference range may be updated (from an initial value to a final value) based on detection of at least two sound sources. The electronic apparatus 102 may determine that sounds emitted by each sound source of the at least two sound sources are of interest to the user 118. Based on such a determination, the initial value of the threshold difference range may be updated to a higher value. The update may indicate intention of the user 118 to focus on the sounds emitted by the at least two sound sources (such as a speech by two persons in-front of the user 118). In at least one embodiment, the intention may be detected based on a movement of the head of the user 118 in a direction of the at least two sound sources during at least two time-instances. At each time instant of the at least two time-instances of the movement of the head of the user 118, the first difference may be less than the initial value of the threshold difference range. Further, a time difference between the at least two instances may be less than a threshold time interval.

The electronic apparatus 102 may be further configured to amplify or filter each of the first sound signal and the second sound signal based on the determination that the difference is within the threshold difference range. In a conversation (in a noisy environment) people usually face each other during communication. With a suitable threshold difference range, the user 118 can look (i.e., move head) in the direction they want the sound to amplified (which in a noisy environment may be towards a person during a discussion or a different type of source). The amount of directionality may be adjusted to select a focus area in that direction. For example, the focus area (in terms of the threshold difference range) may be selected to be directly in front of head, a value of +/−10 degrees, a value of +/−30 degrees, a value of +/−60 degrees, and the like. In an embodiment, the directionality (through the user input) may be controlled by a switch on the electronic apparatus 102) to avoid the need for an application-based control. By focusing on the sound in front of the head, speech comprehension in noisy environments may dramatically increase, with the focus based simply on the direction the user 118 is looking.

In accordance with an embodiment, it may be determined that the first difference between the first sound signal and the second sound signal is outside the threshold difference range. Specifically, the first difference may be outside the threshold difference range if the phase difference (i.e., delay) between the first sound signal and the second sound signal is outside the phase difference range or if the amplitude difference (which may be computed at a particular time-instant) between the first sound signal and the second sound signal is outside the amplitude difference range. Such determination (that the first difference is outside the threshold difference range) may indicate that the user 118, is not facing the sound sources closely enough to meet the set thresholds, or that the sources are outside a focus area that is preferred by the user 118. In such a case, the electronic apparatus 102 may either not apply filtering to those parts of the signals or attenuate those parts of the signals. The attenuation may help to improve the speech intelligibility as the user 118 may be able to focus more easily on the sound from the sound sources that the user 118 may be facing.

The electronic apparatus 102 may be further configured to control, via a plurality of sound output devices, a playback of the amplified first sound signal and the amplified second sound signal. For example, the plurality of sound output devices may include the first sound output device 112 and the second sound output device 114. The first sound output device 112 may output the amplified first sound signal and the second sound output device 114 may output the amplified second sound signal.

In most scenarios, unwanted sound may arrive from sources behind the head in addition to the sounds that arrive from the sources in the front of the user 118. The electronic apparatus 102 may use frequency response analysis to separate and exclude sounds from the rear of the head from the amplification. Due to the shape of the ear, a head related transfer function (HRTF) is inherently applied to sound as it passes over the ears of a user 118. Typically, the ears tend to have ridges along the back edge, and as sound passes over the ridges from behind the head, the frequency response of the sounds is changed by the ear geometry in ways that are different than sound from the front of the head is changed by the ear geometry. There are certain frequencies that are affected in particular ways, and analysis of such frequencies may be enough to separate sounds in front of the head from sounds behind the head. A similar frequency analysis may also be utilized to separate sounds coming from other directions besides from front and back, such as higher or lower in front of the head.

In accordance with an embodiment, the electronic apparatus 102 may be configured to receive a sound signal via the first sound input device 108 and/or the second sound input device 110. The third sound signal may correspond to the second sound source 124, for example. The electronic apparatus 102 may analyze the received signal to determine a frequency response of the sound signal. Thereafter, a pre-determined logic may be applied on the determined frequency based on a frequency response of each of the first sound signal and the second sound signal. The application may be based on a HRTF. Based on a comparison of the determined frequency response with the frequency responses of the first sound signal and the second sound signal, the electronic apparatus 102 may determine that the frequency response associated with the third sound signal is different from that of the first sound signal and the second sound signal. The difference may be detected in a particular portion of the frequency response (i.e., a band of frequencies) of the third sound signal. The electronic apparatus 102 may filter the third sound signal based on the comparison.

Figure 2:
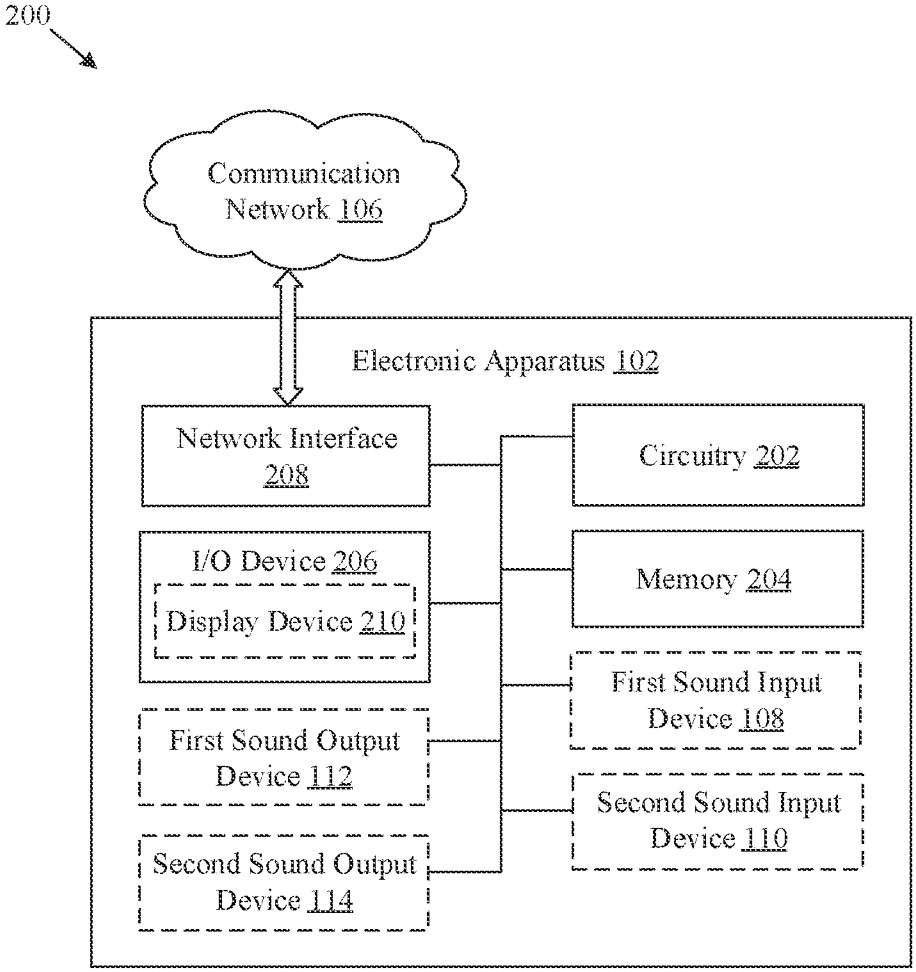
FIG. 2 is a block diagram that illustrates an exemplary electronic apparatus of FIG. 1 for audio filtering of incoming sound from specific directions.

FIG. 2 is a block diagram that illustrates an exemplary electronic apparatus of FIG. 1 for audio filtering of incoming sound from specific directions, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202, a memory 204, an input/output (I/O) device 206, a network interface 208, the first sound input device 108, the second sound input device 110, the first sound output device 112, and the second sound output device 114. In at least one embodiment, the I/O device 206 may also include a display device 210. The circuitry 202 may be communicatively coupled to the memory 204, the I/O device 206, the network interface 208, the first sound input device 108, the second sound input device 110, the first sound output device 112, and the second sound output device 114, via wired or wireless communication of the electronic apparatus 102.

The circuitry 202 may include suitable logic, circuitry, and interfaces that may be configured to execute program instructions associated with different operations to be executed by the electronic apparatus 102. The operations may be executed for audio filtering of incoming sound from specific directions. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The program instructions stored on the memory 204 may enable the circuitry 202 to execute operations of the circuitry 202 (the electronic apparatus 102). In an embodiment, the memory 204 may be configured to store the sounds captured by each of the first sound input device 108 and the second sound input device 110. The memory 204 may be further configured to store electrical or digital representations of sound waves extracted based on unmixing of the captured sound. The memory 204 may also store frequency response data associated with the sound signals. Examples of implementation of the memory 204 may include, Random Access Memory (RAM), Read Only Memory (ROM), Hard Disk Drive (HDD), Electrically Erasable Programmable Read-Only Memory (EEPROM), a Solid-State Drive (SSD), a CPU cache, or a Secure Digital (SD) card.

The I/O device 206 may include suitable logic, circuitry, interfaces, and/or code that may be configured to receive an input and provide an output based on the received input. For example, the I/O device 206 may receive user inputs indicative of values for a threshold difference range, such as an amplitude difference range or a phase difference range. Examples of the I/O device 206 may include, but are not limited to, a touch screen, a keyboard, a mouse, a joystick, a microphone, the display device 210, and a speaker.

The I/O device 206 may include the display device 210. The display device 210 may include suitable logic, circuitry, and interfaces that may be configured to receive inputs from the circuitry 202 to render, on a display screen, visualizations of each of the captured sound waves, the extracted sound waves, the sound signals, and the frequency responses of the sound signals. In at least one embodiment, the display screen of the display device 210 may be at least one of a resistive touch screen, a capacitive touch screen, or a thermal touch screen. The display device 210 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate a communication between the circuitry 202 and the server 104, via the communication network 106. The network interface 208 may be implemented by use of various known technologies to support wired or wireless communication of the electronic apparatus 102 with the communication network 106. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless peer-to-peer protocol.

The functions or operations executed by the electronic apparatus 102, as described in FIG. 1, may be performed by the circuitry 202. Operations executed by the circuitry 202 are described in detail, for example, in FIGS. 3A and 3B.

Figure 3A:
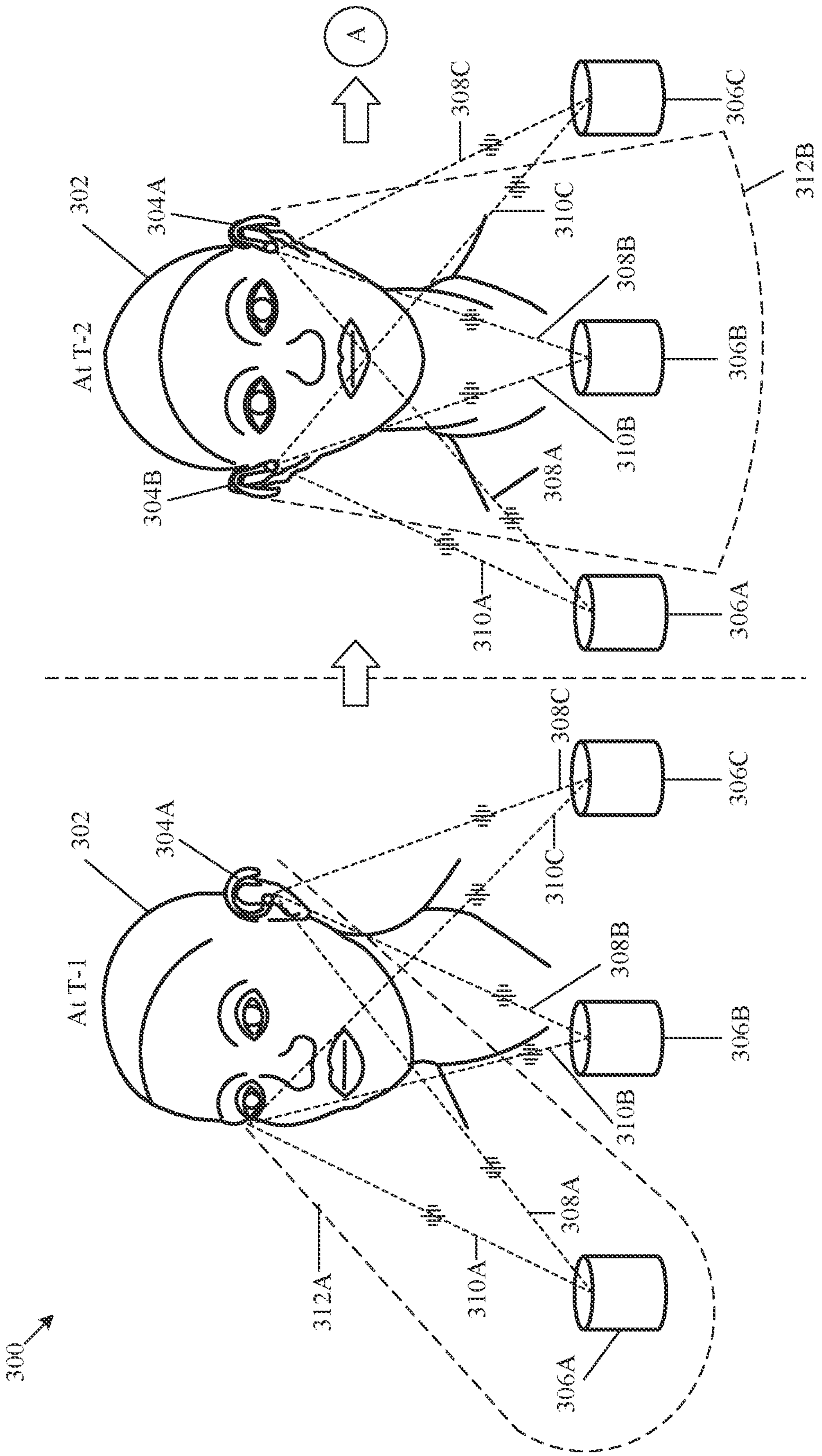
FIGS. 3A and 3B are diagrams that illustrate an exemplary scenario for directional audio filtering based on a head orientation of a user, in accordance with an embodiment of the disclosure.
Figure 3B:
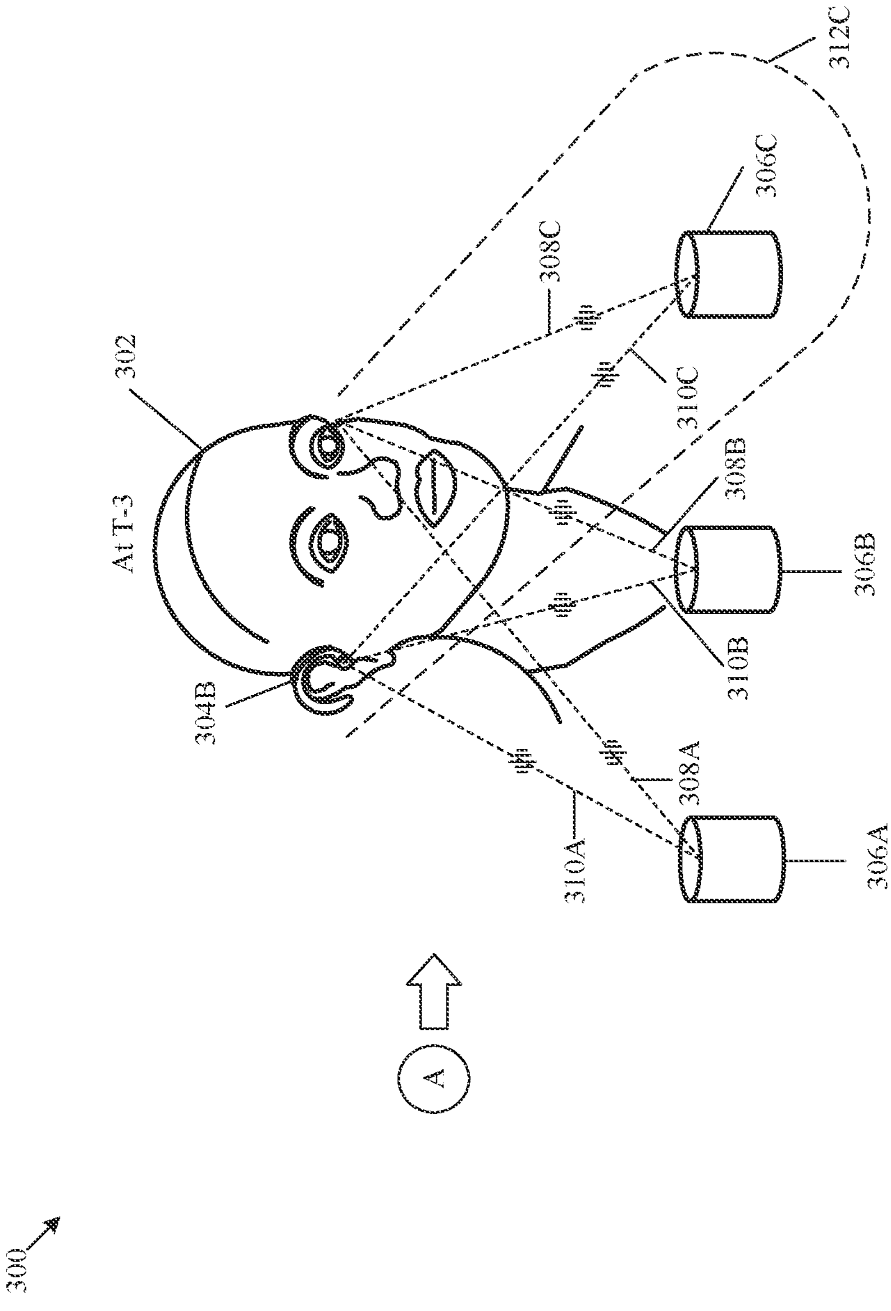

FIGS. 3A and 3B are diagrams that illustrate an exemplary scenario for directional audio filtering based on a head orientation of a user, in accordance with an embodiment of the disclosure. FIGS. 3A and 3B are explained in conjunction with elements from FIG. 1 and FIG. 2. With reference to FIGS. 3A and 3B, there is shown an exemplary scenario 300. In the exemplary scenario 300, there is shown a user 302 wearing a first hearing-aid 304A on the left ear and a second hearing-aid 304B on the right ear. The first hearing-aid 304A and the second hearing-aid 304B may be exemplary implementations of the electronic apparatus 102. The first hearing-aid 304A may include a first microphone (i.e., an exemplary implementation of the first sound input device 108) and a first speaker (i.e., an exemplary implementation of the first sound output device 112). The second hearing-aid 304B may include a second microphone (i.e., an exemplary implementation of the second sound input device 110) and a second speaker (i.e., an exemplary implementation of the second sound output device 114). The circuitry 202 may filter (i.e., amplify) sound signals that correspond to sound signals of interest to the user 302 and may attenuate sound signals that correspond to noise. The amplification and attenuation may be based on the direction of the sound sources. In at least one embodiment, the direction may be determined based on relative properties (such as amplitude and phase) of the sound signals received via the first and second microphones. The relative properties of the sound signals may vary based on changes in the orientation of the head of the user 302.

In certain situations, the user 302 may be situated in a noisy environment that may include a plurality of sound sources, such as a first sound source 306A, a second sound source 306B, and a third sound source 306C. The plurality of sound sources may simultaneously emit sound. Each of the first microphone and the second microphone may capture a sound. In some instances, the sound captured by each microphone may be a mixture of sound generated by each of the plurality of sound sources. By using audio source separation techniques, the sound signals from each of the plurality of sound sources may be extracted. For example, sound signals 308A, 308B, and 308C associated with the first sound source 306A, the second sound source 306B, and the third sound source 306C, respectively, may be extracted from the sound captured by the first microphone of the first hearing-aid 304A. Similarly, sound signals 310A, 310B, and 310C associated with the first sound source 306A, the second sound source 306B, and the third sound source 306C, respectively, may be extracted from the sound captured by the second microphone of the second hearing-aid 304B (not shown).

Based on a head orientation of the user 302 at a particular time-instant (such as at T-1, T-2, or T-3), certain sound sources of the plurality of sound sources may be determined as sources of interest for the user 302. Whereas, remaining sound sources of the plurality of sound sources may be determined as noise sources. Such determinations may be based on relative properties (such as a phase difference or an amplitude difference) of the sound signals.

For example, at time-instant T-1 (as shown in FIG. 3A), the circuitry 202 may determine at least one of a phase difference or an amplitude difference between sound signals 308A and 310A. The phase difference may be within a phase difference range (set by the user 302 as a threshold difference range) and the amplitude difference may be within an amplitude difference range (set by the user 302 as a threshold difference range). Similarly, the circuitry 202 may determine at least one of a phase difference or an amplitude difference between the sound signals 308B and 310B. At T-1, The phase difference may be outside the phase difference range and the amplitude difference may be outside the amplitude difference range. Further, a phase difference or an amplitude difference between sound signals 308C and 310C may be determined to be outside the phase difference range or the amplitude difference range, respectively.

Based on such determinations at T-1, the sound signals 308A and 310A may be determined as sounds of interest for the user 302, whereas sound signals 308B, 310B, 308C, and 310C may be determined as noise. Thereafter, the circuitry 202 may amplify the sound signals 308A and 310A and may attenuate the sound signals 308B, 310B, 308C, and 310C. A lower phase difference or a lower amplitude difference may indicate that a path difference between the sound signals 308A and 310A may be minuscule. Thus, based on the phase difference or the amplitude difference, the circuitry 202 may determine that the user 302 may be facing the first sound source 306A associated with the sound signals 308A and 310A.

In accordance with an embodiment, based on the head orientation of the user 302 (for example, the user may face the right direction) and the threshold difference range (i.e., the phase difference range or the amplitude difference range set by the user 302), a sound source may be required to be situated within a region 312A for amplification of sound signals. Sound signals associated with the sound sources that are situated outside the region 312A may be attenuated.

At time-instant T-2, at least one of the phase difference or the amplitude difference between the sound signals 308B and 310B may be determined to be within the phase difference range or the amplitude difference range, respectively. Similarly, at least one of the phase difference or the amplitude difference between the sound signals 308A and 310A may be outside the phase difference range or the amplitude difference range, respectively. Further, at least one of the phase difference or the amplitude difference between the sound signals 308C and 310C may be outside the phase difference range or the amplitude difference range, respectively. Based on such determinations, the sound signals 308B and 310B may be determined as sounds of interest for the user 302, whereas sound signals 308A, 310A, 308C, and 310C may be determined as noise. The circuitry 202 may amplify the sound signals 308B and 310B may attenuate the sound signals 308A, 310A, 308C, and 310C. The circuitry 202 may further determine that the user 302 is likely facing the second sound source 306B associated with the sound signals 308B and 310B. Further, a sound source may be required to be within a region 312B for amplification of sound signals associated with the sound source. Sound signals associated with the sound sources situated outside the region 312B may be attenuated.

At time-instant T-3 (see FIG. 3B), sound signals 308C and 310C may be determined as sounds of interest for the user 302, whereas sound signals 308A, 310A, 308B, and 310B may be determined as noise. The circuitry 202 may amplify the sound signals 308C and 310C and may further attenuate the sound signals 308A, 310A, 308B, and 310B. The circuitry 202 may further determine that the user 302 is facing the third sound source 306C associated with the sound signals 308C and 310C. Further, a sound source may be required to be situated within a region 312C for amplification of sound signals associated with that sound source. Sound signals associated with the sound sources situated outside the region 312C may be attenuated.

Figure 4:
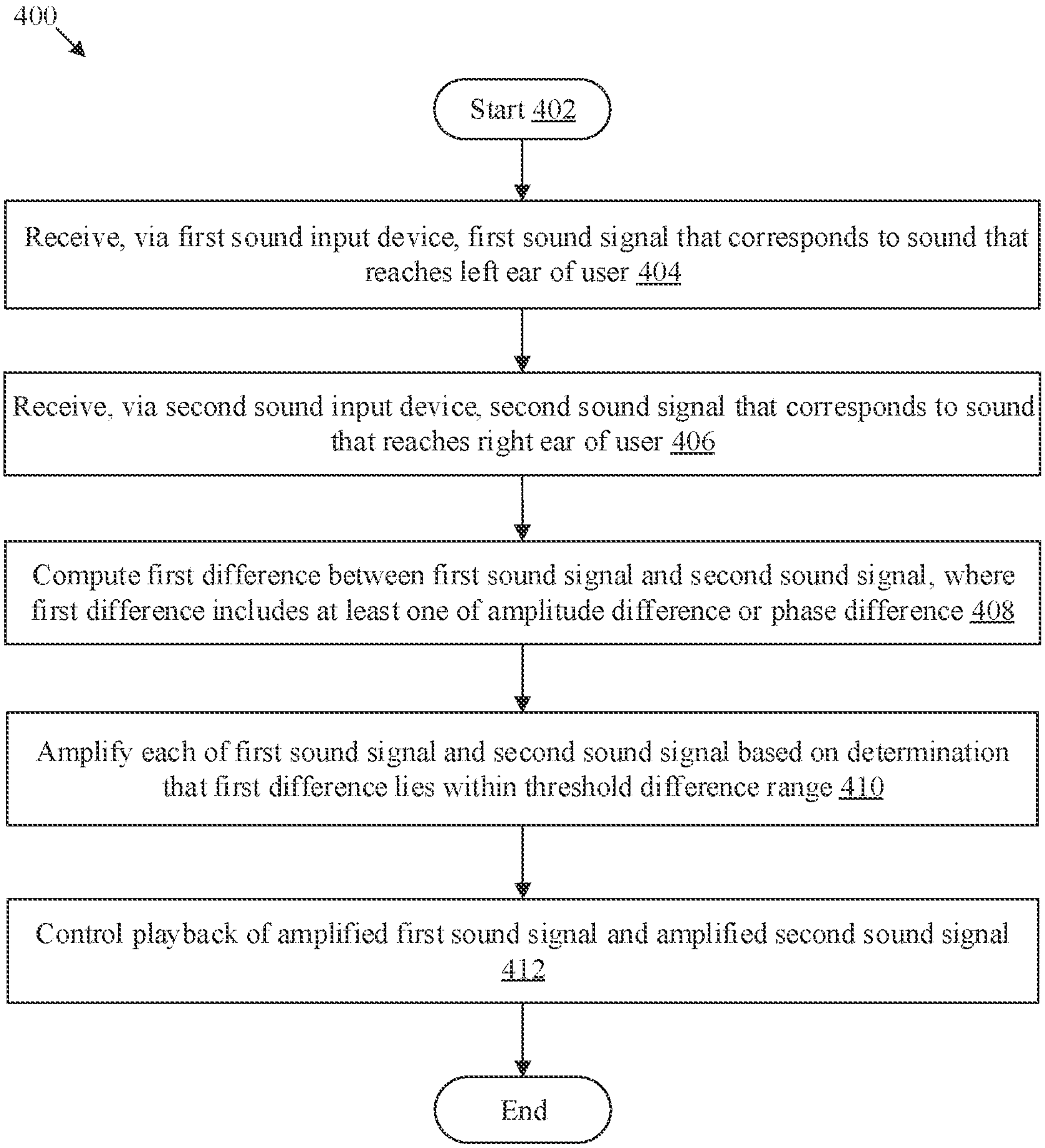
FIG. 4 is a flowchart that illustrates operations for an exemplary method for audio enhancement for incoming sound from specific directions, in accordance with an embodiment of the disclosure.

FIG. 4 is a flowchart that illustrates operations for an exemplary method for audio enhancement for incoming sound from specific directions, in accordance with an embodiment of the disclosure. FIG. 4 is explained in conjunction with elements from FIGS. 1, 2, 3A, and 3B. With reference to FIG. 4, there is shown a flowchart 400. The operations from 402 to 412 may be implemented by any computing system, such as, by the electronic apparatus 102 of FIG. 1 or the circuitry 202 of FIG. 2. The operations may start at 402 and may proceed to 404.

At 404, a first sound signal, that may correspond to a sound that may be reaching a left ear of a user (such as the user 118), may be received via a first sound input device (such as the first sound input device 108). In at least one embodiment, the circuitry 202 may be configured to receive, via the first sound input device 108, the first sound signal that may correspond to the sound that may be reaching the left ear of the user 118. The details of reception of the first sound signal, are described, for example, in FIG. 1, FIG. 3A, and FIG. 3B.

At 406, a second sound signal, that may correspond to a sound that may be reaching a right ear of the user 118, may be received via a second sound input device (such as the second sound input device 110). In at least one embodiment, the circuitry 202 may be configured to receive, via the second input device 110, the second sound signal that may correspond to the sound that may be reaching the right ear of the user 118. The details of reception of the second sound signal, are described, for example, in FIG. 1, FIG. 3A, and FIG. 3B.

At 408, a difference between the first sound signal and the second sound signal may be computed. In at least one embodiment, the circuitry 202 may be configured to compute the difference between the first sound signal and the second sound signal. The difference may include at least one of an amplitude difference or a phase difference. The details of computation of the difference, are described, for example, in FIG. 1, FIG. 3A, and FIG. 3B.

At 410, the difference may be determined to be within a threshold difference range. In at least one embodiment, the circuitry 202 may be configured to determine the difference to be within the threshold difference range. The details of the determination to be within the threshold difference range, are described, for example, in FIG. 1, FIG. 3A, and FIG. 3B.

At 410, each of the first sound signal and the second sound signal may be amplified or filtered based on the determination that the difference is within the threshold difference range. In at least one embodiment, the circuitry 202 may be configured to amplify each of the first sound signal and the second sound signal based on the determination that the difference is within the threshold difference range. The details of amplification of the each of the first sound signal and the second sound signal, are described, for example, in FIG. 1, FIG. 3A, and FIG. 3B.

At 412, a playback of the amplified first sound signal and the amplified second sound signal may be controlled via a plurality of sound output devices (such as the first sound output device 112 and the second sound output device 114). In at least one embodiment, the circuitry 202 may be configured to control, via the plurality of sound output devices (i.e., the first sound output device 112 and the second sound output device 114) the playback of the amplified first sound signal and the amplified second sound signal. The details of control of the playback of the amplified first sound signal and the amplified second sound signal, are described, for example, in FIG. 1, FIG. 3A, and FIG. 3B. Control may pass to end.

Although the flowchart 400 is illustrated as discrete operations, such as 404, 406, 408, 410, and 412, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate a system (such as the electronic apparatus 102). The computer-executable instructions may cause the machine and/or computer to perform operations that include reception, via a first sound input device (such as the first sound input device 108), a first sound signal that may correspond to a sound that may be reaching a left ear of a user (such as the user 118). The operations may further include reception, via a second sound input device (such as the second sound input device 110), a second sound signal that may correspond to a sound that may be reaching a right ear of the user 118. The operations may further include computation of a difference between the first sound signal and the second sound signal. The difference may include at least one of an amplitude difference or a phase difference. The operations may further include a determination of the difference to be within a threshold difference range. The operations may further include amplification or filtering of each of the first sound signal and the second sound signal based on the determination that the difference is within the threshold difference range or outside of the threshold difference range. The operations may further include a check of frequency response to pass sound based on its source position relative to the user 118. The operations may further include controlling, via a plurality of sound output devices (such as the first sound output device 112 and the second sound output device 114), of a playback of the amplified or filtered first sound signal and the amplified or filtered second sound signal.

Exemplary aspects of the disclosure may include an electronic apparatus (such as, the electronic apparatus 102 of FIG. 1) that may include circuitry (such as, the circuitry 202). In an embodiment, the electronic apparatus 102 may include a plurality of sound input devices (such as the first sound input device 108 and the second sound input device 110) and a plurality of sound output devices (such as the first sound output device 112 and the second sound output device 114). The circuitry 202 may be configured to receive, via the first sound input device 108, a first sound signal that may correspond to a sound that may reach a left ear of a user (such as the user 118). The circuitry 202 may be further configured to receive, via the second sound input device 110, a second sound signal that may correspond to the sound that may reach a right ear of the user 118. The circuitry 202 may be further configured to compute a difference between the first sound signal and the second sound signal. The difference may include at least one of an amplitude difference or a phase difference. The circuitry 202 may be further configured to determine the difference to be within a threshold difference range. The circuitry 202 may be further configured to amplify or filter each of the first sound signal and the second sound signal based on the determination that the difference is within the threshold difference range or outside of the threshold difference range. The circuitry 202 may be further configured to include a check of frequency response to pass sound based on its source position relative to the user 118. The circuitry 202 may be further configured to control, via a plurality of sound output devices (i.e., the first sound output device 112 and the second sound output device 114), a playback of the amplified or filtered first sound signal and the amplified or filtered second sound signal. The plurality of sound output devices may be included in the electronic apparatus 102 and the electronic apparatus 102 may be a hearing-aid device.

In accordance with an embodiment, the circuitry 202 may be further configured to determine a first time of the reception of the first sound signal. The circuitry 202 may be further configured to determine a second time of the reception of the second sound signal. The circuitry 202 may be further configured to compute the phase difference between the first sound signal and the second sound signal based on a difference between the first time and the second time. The threshold difference range may correspond to a phase difference range and the amplification or filtering of each of the first sound signal and the second sound signal may be based on a determination that the computed phase difference is within the phase difference range.

In accordance with an embodiment, the circuitry 202 may be further configured to attenuate or filter each of the first sound signal and the second sound signal based on a determination that the computed phase difference is outside the phase difference range.

In accordance with an embodiment, the circuitry 202 may be further configured to measure a first amplitude of the first sound signal. The circuitry 202 may be further configured to measure a second amplitude of the second sound signal. The circuitry 202 may be further configured to compute the amplitude difference between the first sound signal and the second sound signal based on a difference between the first amplitude and the second amplitude. The threshold difference range may correspond to an amplitude difference range and the amplification of each of the first sound signal and the second sound signal may be based on a determination that the computed amplitude difference is within the amplitude difference range.

In accordance with an embodiment, the circuitry 202 may be further configured to attenuate or filter each of the first sound signal and the second sound signal based on a determination that the computed phase difference is outside the amplitude difference range.

In accordance with an embodiment, the circuitry 202 may be further configured to receive a user input that may be indicative of values for the threshold difference range. The user input may be a touch input, a gesture input, a voice input, or an input different from the touch input, the gesture input, and the voice input.

In accordance with an embodiment, the circuitry 202 may be further configured to receive a sound signal via the first sound input device 108 or the second sound input device 110. The circuitry 202 may be further configured to analyze the received sound signal to determine a frequency response associated with the sound signal. The circuitry 202 may be further configured to apply a predetermined logic on the determined frequency response based on frequency response characteristics of the first sound signal and the second sound signal. The application of the predetermined logic may be based on a head related transfer function. The circuitry 202 may be further configured to filter the sound signal based on a comparison of the determined frequency response with the expected frequency response characteristics of the first sound signal and the second sound signal.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic apparatus, comprising:

circuitry configured to:

receive, via a first sound input device, a first sound signal that corresponds to a sound that reaches a left ear of a user;

receive, via a second sound input device, a second sound signal that corresponds to the sound that reaches a right ear of the user;

compute a difference between the first sound signal and the second sound signal, wherein the difference includes at least one of an amplitude difference or a phase difference;

determine the computed difference is within a threshold difference range;

amplify or filter each of the first sound signal and the second sound signal based on the determination that the computed difference is within the threshold difference range;

receive, via one of the first sound input device or the second sound input device, a third sound signal;

analyze the received third sound signal to determine a frequency response associated with the received third sound signal;

apply a specific logic on the determined frequency response based on:

frequency response characteristics of the each of the first sound signal and the second sound signal, and a head related transfer function;

compare the determined frequency response of the third sound signal with the frequency response characteristics of the each of the first sound signal and the second sound signal;

filter the analyzed third sound signal based on the comparison between the determined frequency response of the third sound signal and the frequency response characteristics of the each of the first sound signal and the second sound signal; and control, via a plurality of sound output devices, a playback of the amplified or filtered first sound signal, the amplified or filtered second sound signal, and the filtered third sound signal.

2. The electronic apparatus according to claim 1, wherein the circuitry is further configured to:

determine a first time of the reception of the first sound signal;

determine a second time of the reception of the second sound signal; and compute the phase difference between the first sound signal and the second sound signal based on a difference between the first time and the second time, wherein the threshold difference range corresponds to a phase difference range, and the amplification or the filter of the each of the first sound signal and the second sound signal is based on the determination that the computed phase difference is within the phase difference range.

3. The electronic apparatus according to claim 2, wherein the circuitry is further configured to:

determine the computed phase difference is outside the phase difference range; and attenuate or filter the each of the first sound signal and the second sound signal based on the determination that the computed phase difference is outside the phase difference range.

4. The electronic apparatus according to claim 1, wherein the circuitry is further configured to:

measure a first amplitude of the first sound signal;

measure a second amplitude of the second sound signal; and compute the amplitude difference between the first sound signal and the second sound signal based on a difference between the first amplitude and the second amplitude, wherein the threshold difference range corresponds to an amplitude difference range, and the amplification or the filter of the each of the first sound signal and the second sound signal is based on the determination that the computed amplitude difference is within the amplitude difference range.

5. The electronic apparatus according to claim 4, wherein the circuitry is further configured to:

determine the computed amplitude difference is outside the amplitude difference range; and attenuate or filter the each of the first sound signal and the second sound signal based on the determination that the computed amplitude difference is outside the amplitude difference range.

6. The electronic apparatus according to claim 1, wherein the circuitry is further configured to receive a user input that indicates a plurality of values for the threshold difference range, and the user input is one of a touch input, a gesture input, a voice input, or an input different from the touch input, the gesture input, and the voice input.

7. The electronic apparatus according to claim 1, wherein the plurality of sound output devices is in the electronic apparatus, and the electronic apparatus is a hearing-aid device.

8. A method, comprising:

in an electronic apparatus:

receiving, via a first sound input device, a first sound signal that corresponds to a sound that reaches a left ear of a user;

receiving, via a second sound input device, a second sound signal that corresponds to the sound that reaches a right ear of the user;

computing a difference between the first sound signal and the second sound signal, wherein the difference includes at least one of an amplitude difference or a phase difference;

determining the computed difference is within a threshold difference range;

amplifying or filtering each of the first sound signal and the second sound signal based on the determination that the computed difference is within the threshold difference range;

receiving, via one of the first sound input device or the second sound input device, a third sound signal;

analyzing the received third sound signal to determine a frequency response associated with the received third sound signal;

applying a specific logic on the determined frequency response based on:

frequency response characteristics of the each of the first sound signal and the second sound signal, and a head related transfer function;

comparing the determined frequency response of the third sound signal with the frequency response characteristics of the each of the first sound signal and the second sound signal;

filtering the analyzed third sound signal based on the comparison between the determined frequency response of the third sound signal and the frequency response characteristics of the each of the first sound signal and the second sound signal; and controlling, via a plurality of sound output devices, a playback of the amplified or filtered first sound signal, the amplified or filtered second sound signal, and the filtered third sound signal.

9. The method according to claim 8, further comprising:

determining a first time of the reception of the first sound signal;

determining a second time of the reception of the second sound signal; and computing the phase difference between the first sound signal and the second sound signal based on a difference between the first time and the second time, wherein the threshold difference range corresponds to a phase difference range, and the amplification or the filtering of the each of the first sound signal and the second sound signal is based on the determination that the computed phase difference is within the phase difference range.

10. The method according to claim 9, further comprising:

determining the computed phase difference is outside the phase difference range; and attenuating or filtering the each of the first sound signal and the second sound signal based on the determination that the computed phase difference is outside the phase difference range.

11. The method according to claim 8, further comprising:

measuring a first amplitude of the first sound signal;

measuring a second amplitude of the second sound signal; and computing the amplitude difference between the first sound signal and the second sound signal based on a difference between the first amplitude and the second amplitude, wherein the threshold difference range corresponds to an amplitude difference range, and the amplification or the filtering of the each of the first sound signal and the second sound signal is based on the determination that the computed amplitude difference is within the amplitude difference range.

12. The method according to claim 11, further comprising:

determining the computed amplitude difference is outside the amplitude difference range; and attenuating or filtering the each of the first sound signal and the second sound signal based on the determination that the computed amplitude difference is outside the amplitude difference range.

13. The method according to claim 8, further comprising receiving a user input that indicates a plurality of values for the threshold difference range, wherein the user input is one of a touch input, a gesture input, a voice input, or an input different from the touch input, the gesture input, and the voice input.

14. The method according to claim 8, wherein the plurality of sound output devices is in the electronic apparatus, and the electronic apparatus is a hearing-aid device.

15. A non-transitory computer-readable medium having stored thereon, computer-executable instructions which, when executed by a computer, cause the computer to execute operations, the operations comprising:

receiving, via a first sound input device, a first sound signal that corresponds to a sound that reaches a left ear of a user;

receiving, via a second sound input device, a second sound signal that corresponds to the sound that reaches a right ear of the user;

computing a difference between the first sound signal and the second sound signal, wherein the difference includes at least one of an amplitude difference or a phase difference;

determining the computed difference is within a threshold difference range;

amplifying or filtering each of the first sound signal and the second sound signal based on the determination that the computed difference is within the threshold difference range;

receiving, via one of the first sound input device or the second sound input device, a third sound signal;

analyzing the received third sound signal to determine a frequency response associated with the received third sound signal;

applying a specific logic on the determined frequency response based on:

frequency response characteristics of the each of the first sound signal and the second sound signal, and a head related transfer function;

comparing the determined frequency response of the third sound signal with the frequency response characteristics of the each of the first sound signal and the second sound signal;

filtering the analyzed third sound signal based on the comparison between the determined frequency response of the third sound signal and the frequency response characteristics of the each of the first sound signal and the second sound signal; and controlling, via a plurality of sound output devices, a playback of the amplified or filtered first sound signal, the amplified or filtered second sound signal, and filtered third sound signal.

* * * * *